(12) United States Patent
Shishido et al.

(10) Patent No.: US 7,252,622 B2
(45) Date of Patent: Aug. 7, 2007

(54) TRANSMISSION, AND CONTROL SYSTEM AND CONTROL METHOD FOR THE TRANSMISSION

(75) Inventors: Kentaro Shishido, Hitachinaka (JP); Naoyuki Ozaki, Hitachinaka (JP); Tetsuo Matsumura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 167 days.

(21) Appl. No.: 10/916,634

(22) Filed: Aug. 12, 2004

(65) Prior Publication Data

US 2005/0037891 A1    Feb. 17, 2005

(30) Foreign Application Priority Data

Aug. 13, 2003    (JP) ............................. 2003-207426

(51) Int. Cl.
*F16H 61/00* (2006.01)
*F16H 59/00* (2006.01)

(52) U.S. Cl. .................... 477/116; 74/336 R
(58) Field of Classification Search ............ 74/329, 74/336 R, 340, 339; 477/79, 80, 109, 115, 477/116, 117; 701/66

See application file for complete search history.

(56) References Cited

U.S. PATENT DOCUMENTS

| 4,627,312 A * | 12/1986 | Fujieda et al. ............ 477/124 |
| 4,727,764 A * | 3/1988 | Klaue ........................ 74/331 |
| 5,313,856 A * | 5/1994 | Schneider et al. ............ 477/80 |
| 6,468,182 B1 | 10/2002 | Brandt et al. |
| 6,550,352 B2 * | 4/2003 | Okada et al. ................ 74/335 |
| 6,871,131 B2 * | 3/2005 | Brandt et al. ................ 701/51 |
| 6,896,641 B2 * | 5/2005 | Matsumura et al. ......... 477/115 |
| 2004/0087413 A1* | 5/2004 | Ozaki et al. ................. 477/79 |
| 2004/0116249 A1* | 6/2004 | Kayano et al. ............. 477/109 |

FOREIGN PATENT DOCUMENTS

| EP | 0 367 020 A1 | 5/1990 |
| EP | 1 150 045 A2 | 10/2001 |
| EP | 1 225 362 A2 | 7/2002 |
| EP | 1 314 915 A2 | 5/2003 |
| JP | 2703169 | 3/1997 |
| WO | WO 00/75532 A1 | 12/2000 |

OTHER PUBLICATIONS

European Search Report dated Aug. 1, 2006 (three (3) pages).

* cited by examiner

*Primary Examiner*—Roger Pang
(74) *Attorney, Agent, or Firm*—Crowell & Moring LLP

(57) ABSTRACT

When torque transmission through the transmitting torque variable mechanism (e.g., an assist clutch) is changed to torque transmission through a meshing gearing after the gearshift, a controlled variable per unit time when the transmitting torque variable mechanism is released is determined or varied according to the vehicle operating condition after a gearshift has been completed. A degraded gearshift feel as a result of axle vibration at the end of the gearshift can thereby be suppressed.

9 Claims, 15 Drawing Sheets

TRANSMISSION, AND CONTROL SYSTEM AND CONTROL METHOD FOR THE TRANSMISSION

BACKGROUND OF THE INVENTION

The present invention relates to a control method and a control system for an automatic transmission.

A motor vehicle with a manual transmission offers better fuel economy as compared with a motor vehicle mounted with a transmission using a torque converter. It is, however, difficult in such a motor vehicle as that with the manual transmission to manipulate a clutch and an accelerator in a coordinated manner when getting the motor vehicle started. If the coordinated operations of the clutch and the accelerator do not go well when the vehicle is started, a large shock occurs as the clutch is engaged. If there is a short supply of a clutch pressure, the engine speed rises sharply, which is commonly referred to as a "revving up phenomenon." If the clutch is quickly engaged when the engine speed is yet to reach a sufficient level, or when the vehicle is started on an uphill slope, the engine can stall.

To solve these problems, a system that automates the clutch and a gearshift using a manual transmission mechanism has been developed. The system is what is called an automated manual transmission, or automated MT.

The conventional automated MT has the disadvantage that there is an interruption of a driving torque occurring from release and engagement operations of the clutch during control for gearshifts. This can at times give passengers of the vehicle a sense of discomfort.

A vehicle provided with an automatic transmission has been proposed to avoid the torque interruption during the gearshift. A known approach to the problem is an assist clutch serving as a transmitting torque variable mechanism provided for the conventional automated MT (see, for example, Japanese Patent No. 2703169). The assist clutch provides control, during a gearshift, for synchronizing rotations and transmitting torque properly for the gearshift. In a vehicle such as that described above, an assist clutch torque release control is provided. In the assist clutch torque release control, after the gearshift to a new meshing gearing has been completed, torque transmitted by the assist clutch is reduced, while torque transmitted by the new meshing gearing after the gearshift is increased.

When the torque transmission through the assist clutch is changed to the torque transmission through the meshing gearing after the gearshift, torque vibration in a transmission output can occur due to a torque step depending on how the assist clutch is controlled. The assist clutch, on the other hand, transmits torque through slippage. This presents a durability problem arising from a quantity of heat generated.

SUMMARY OF THE INVENTION

In view of the foregoing, it is therefore an object of the present invention to suppress torque vibration occurring during a gearshift, and at the same time to extend a service life of a clutch.

To achieve the foregoing object, the present invention determines or varies a controlled variable per unit time according to a vehicle operating condition, when the transmitting torque variable mechanism is released after the gearshift has been completed.

When the torque transmission through the transmitting torque variable mechanism (e.g., an assist clutch) is changed to the torque transmission through the meshing gearing after the gearshift, torque vibration in the transmission output can occur due to a torque step depending on how the transmitting torque variable mechanism is controlled. At this time, the controlled variable may be set or varied so that the transmitting torque variable mechanism is released at a mild pace according to the vehicle operating condition. If this is done, a degraded gearshift feel as a result of axle vibration at the end of the gearshift can be suppressed.

The pace at which the transmitting torque variable mechanism is released may be increased or decreased according to a vehicle operating condition, for example, the quantity of heat generated by the transmitting torque variable mechanism. This can suppress generation of heat from the transmitting torque variable mechanism, leading to enhanced durability.

BRIEF DESCRIPTION OF THE INVENTION

Other objects and advantages of the invention will become apparent from the following description of embodiments with reference to the accompanying drawings in which.

Figure 3:
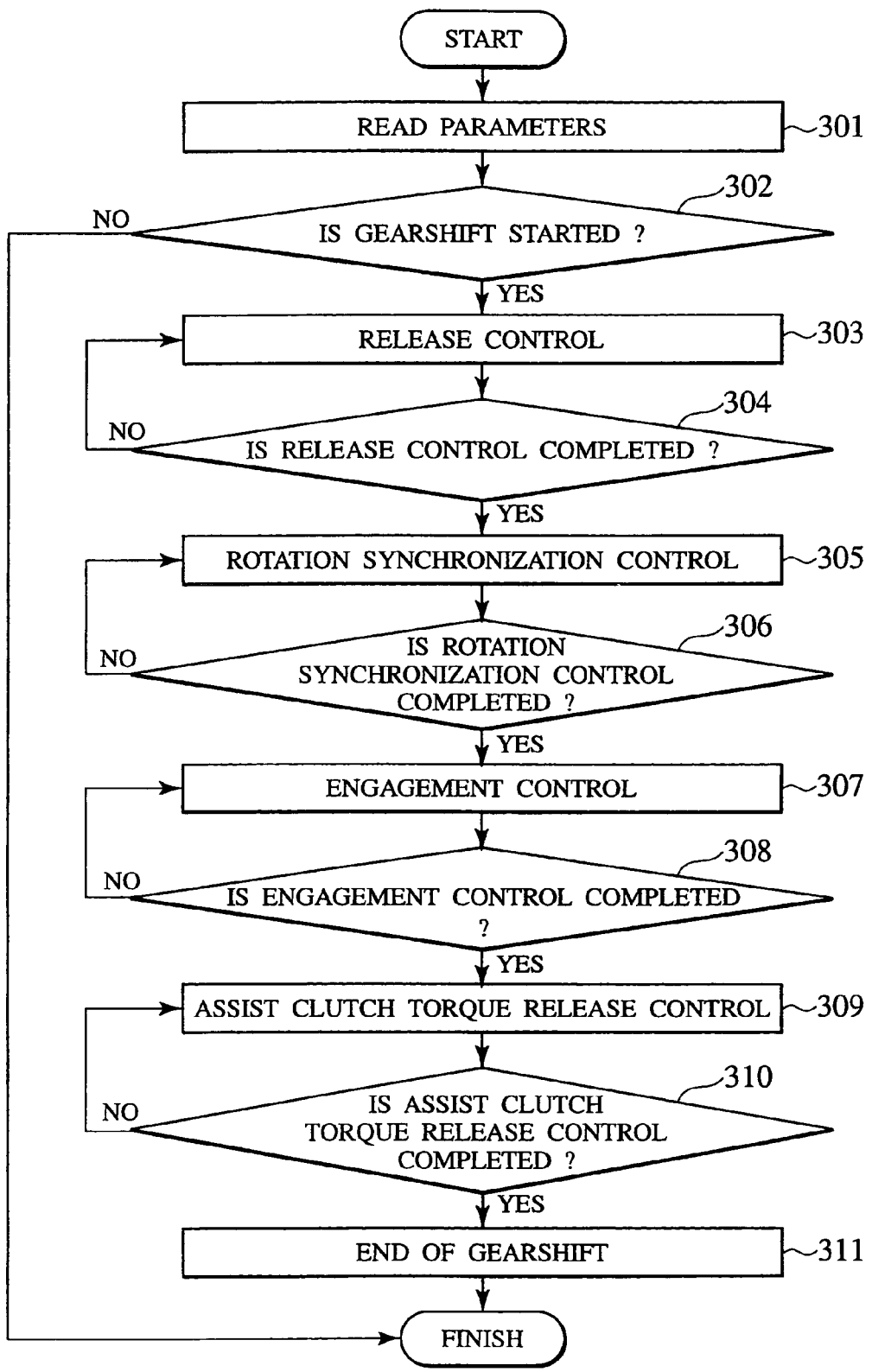
FIG. 3 is a flowchart showing control operations performed by the transmission control means according to the preferred embodiment of the present invention shown in FIG. 1.
Figure 5:
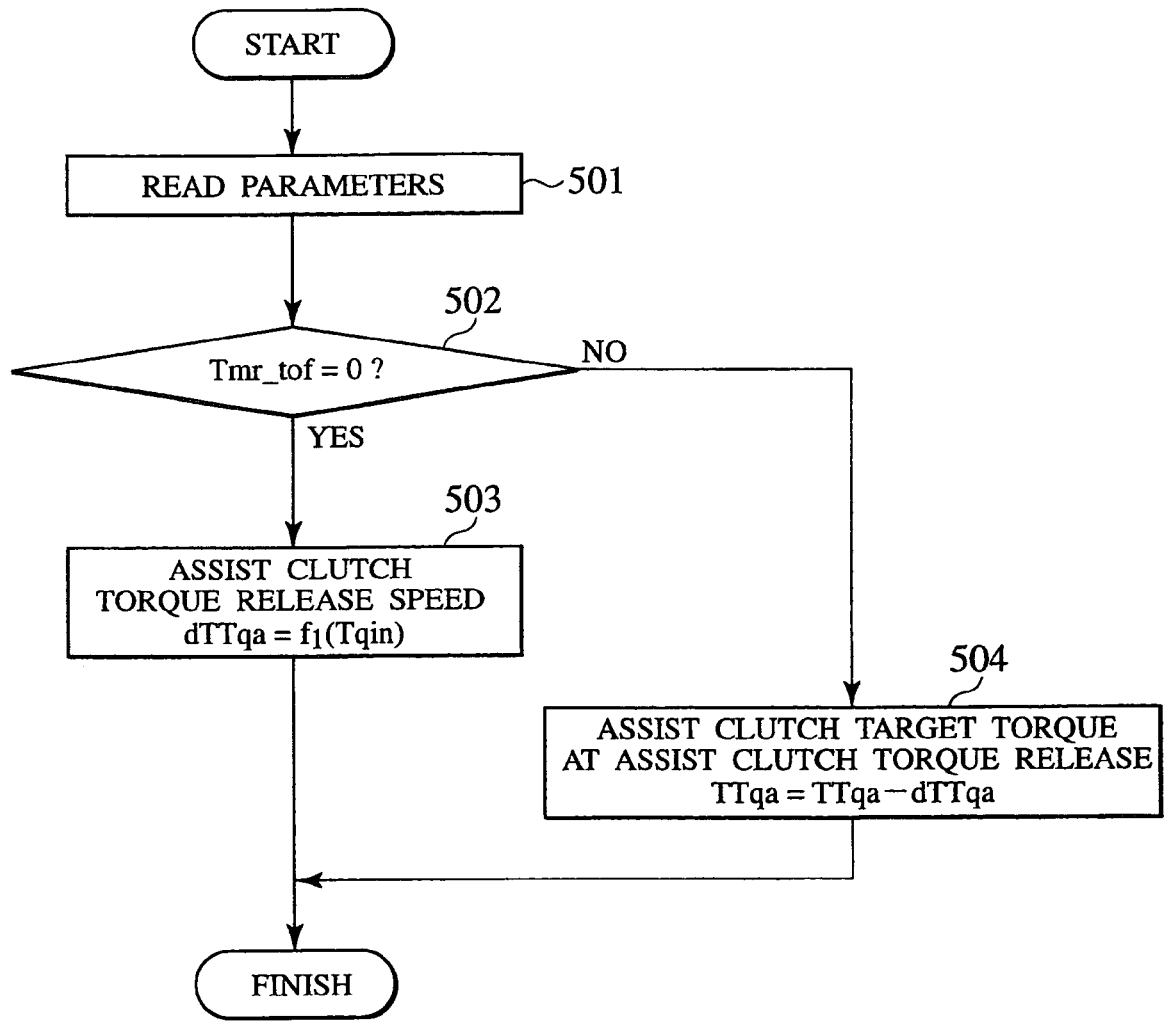
FIG. 5 is a flowchart showing control provided in a first assist clutch transmitting torque release control shown in FIG. 3.
Figure 6:
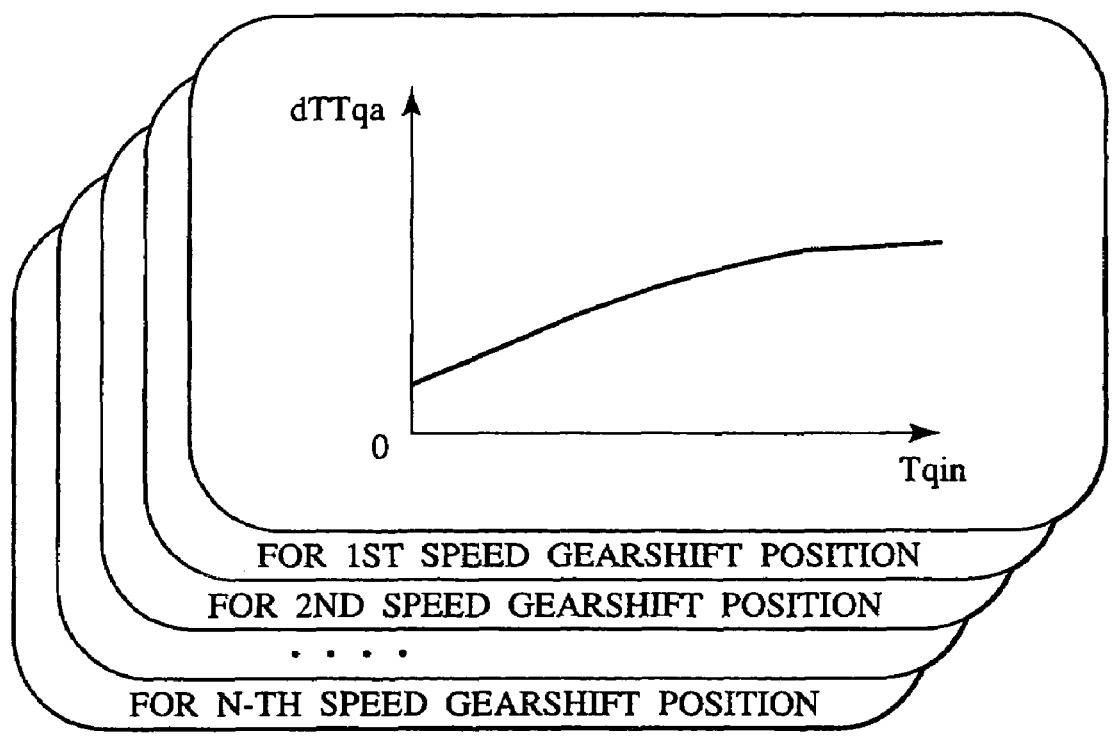
FIG. 6 is a table of a transmitting torque release amount of FIG. 5.
Figure 7:
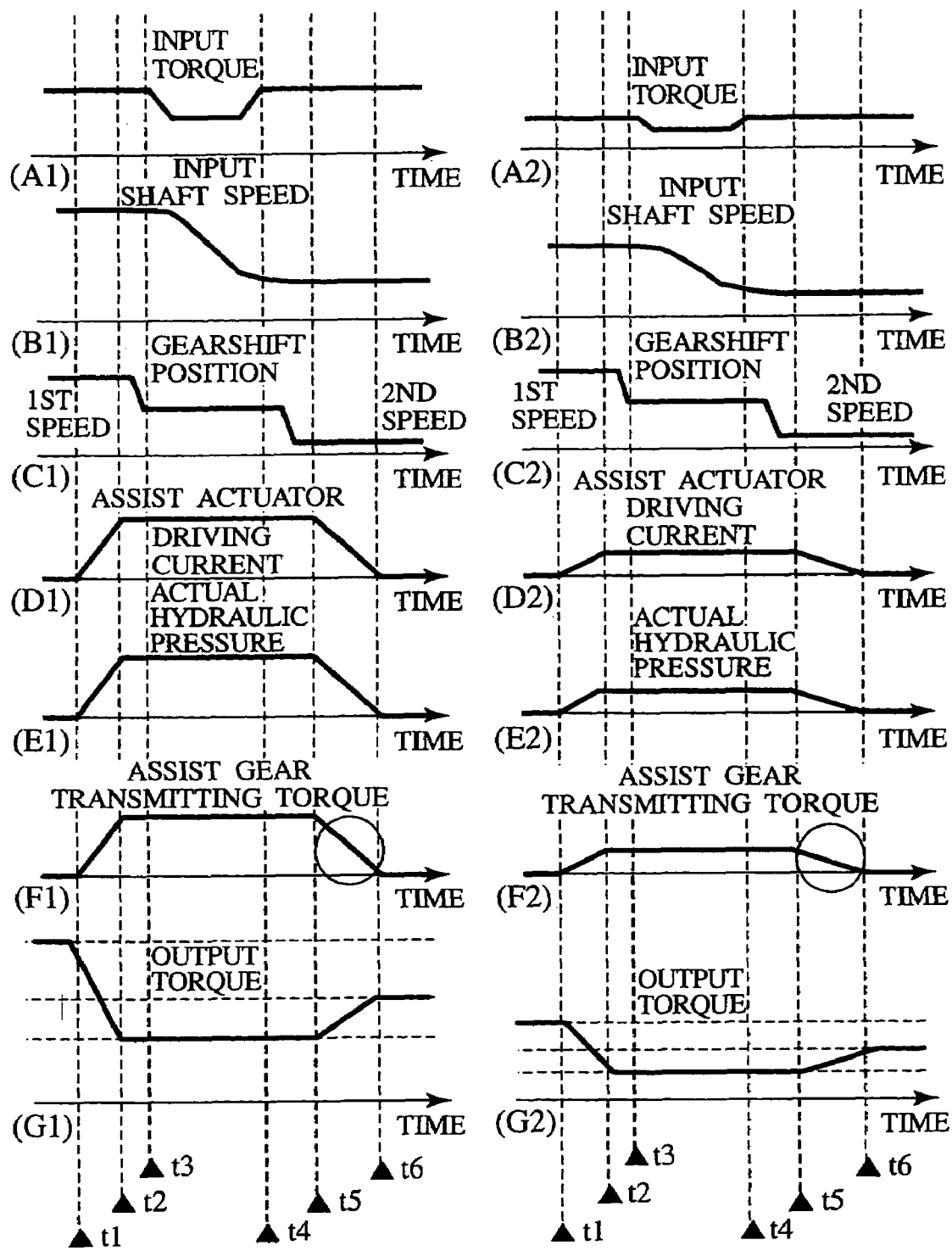
Figure 8:
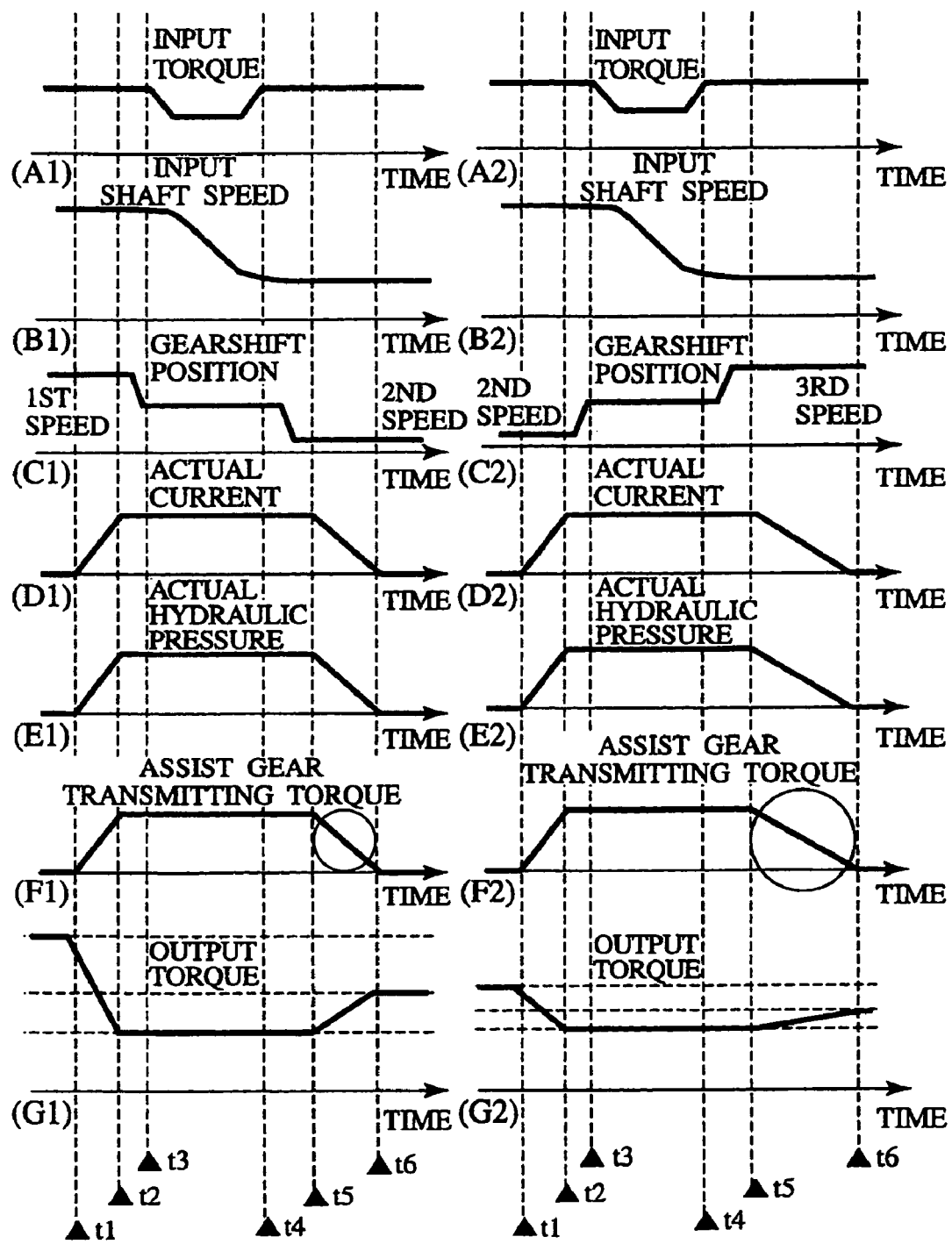
Figure 9:
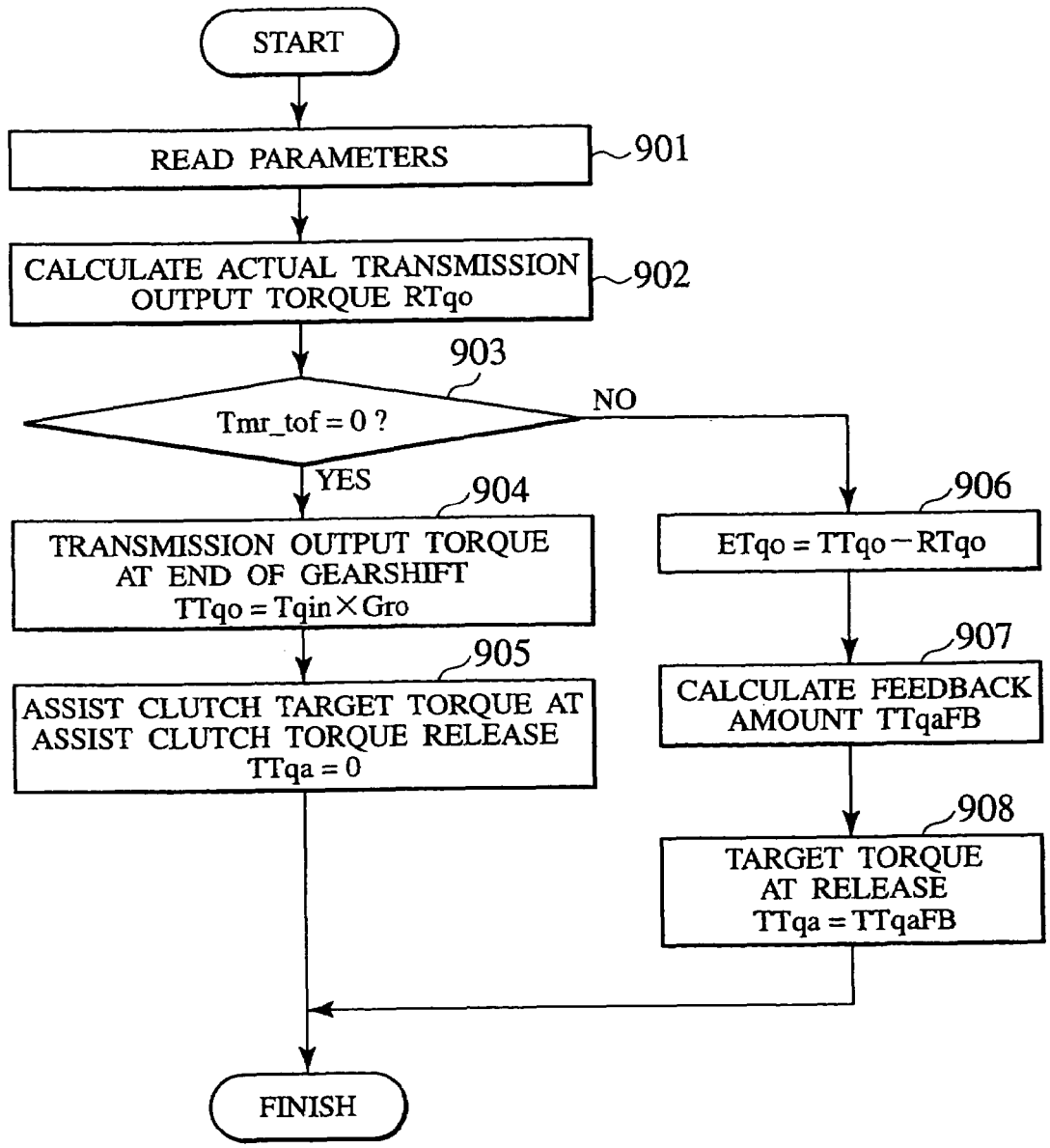
Figure 10:
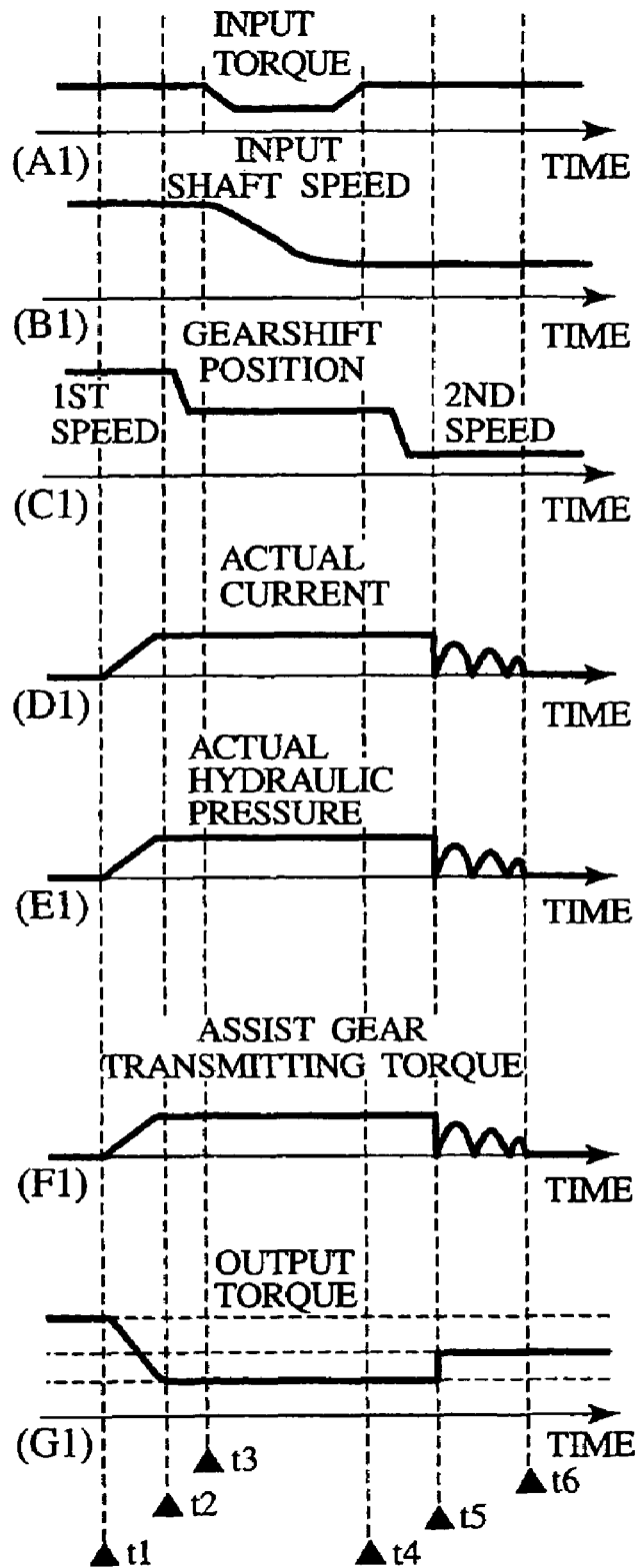
Figure 11:
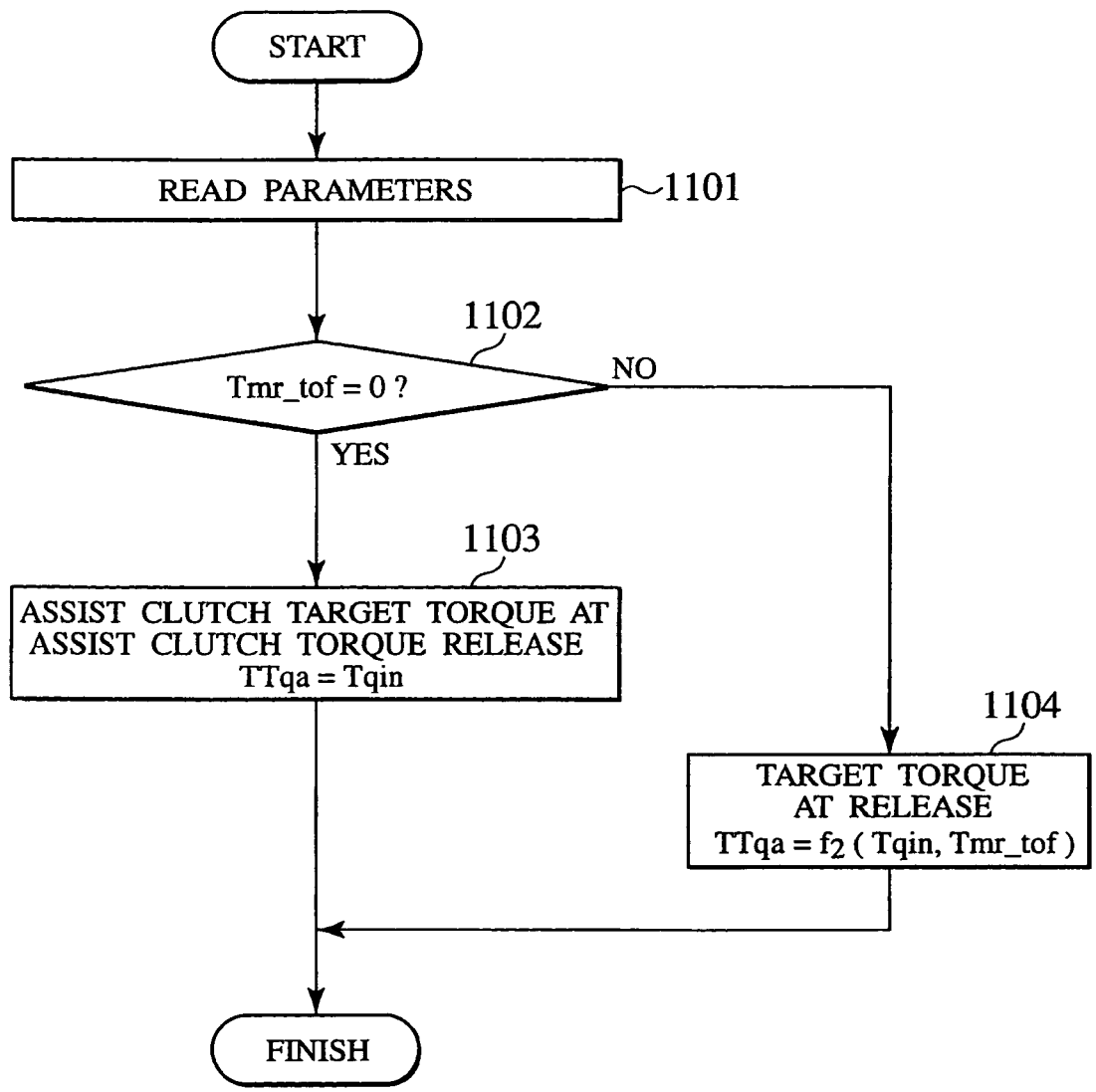
Figure 12:
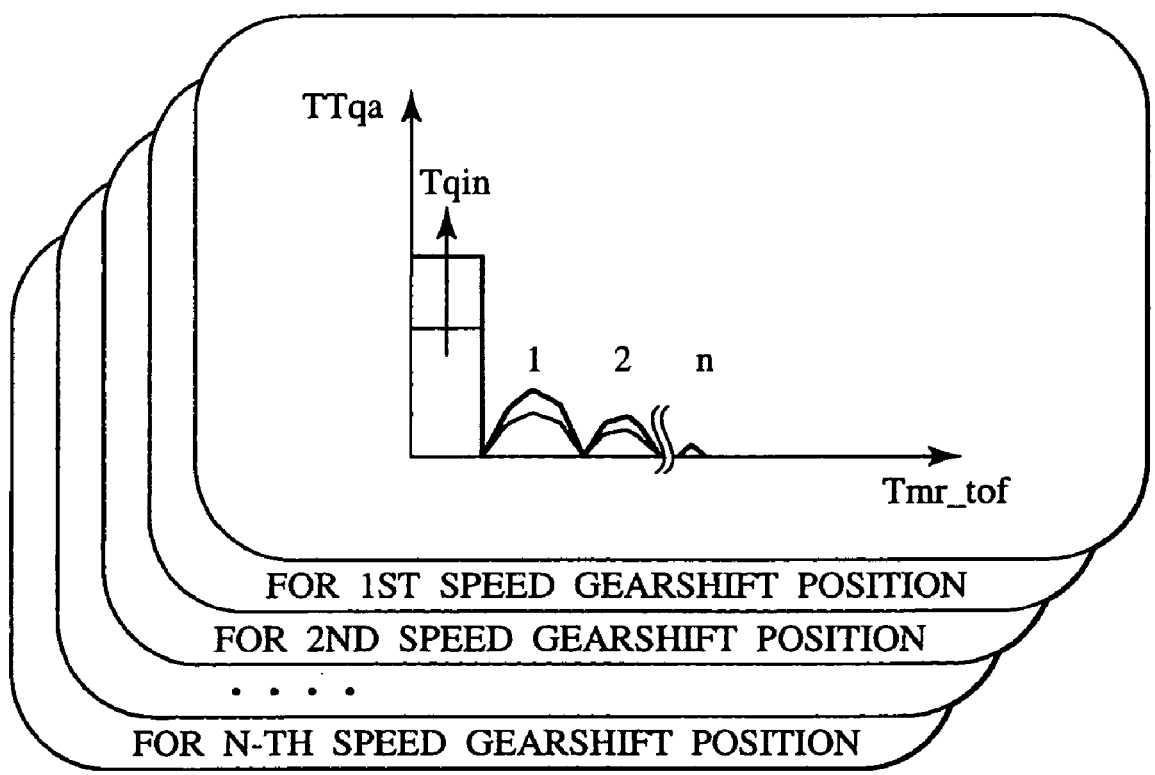
Figure 13:
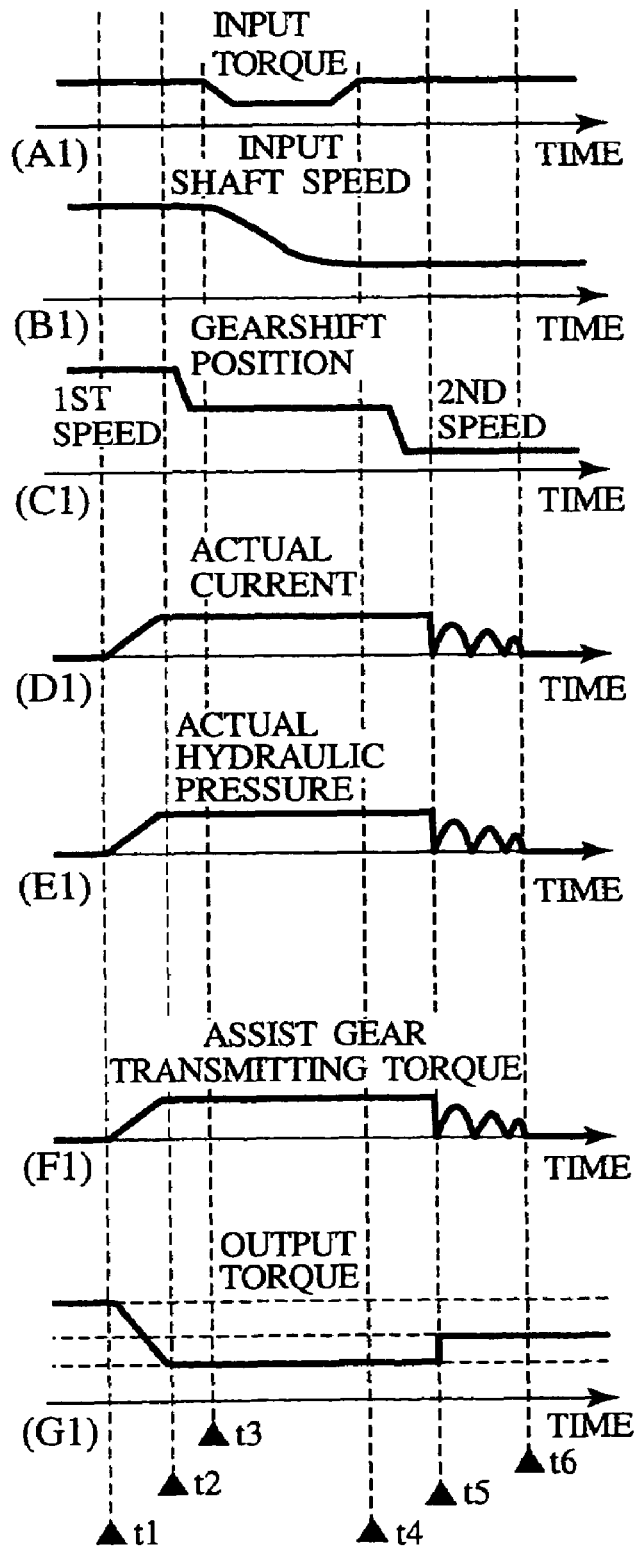
Figure 14:
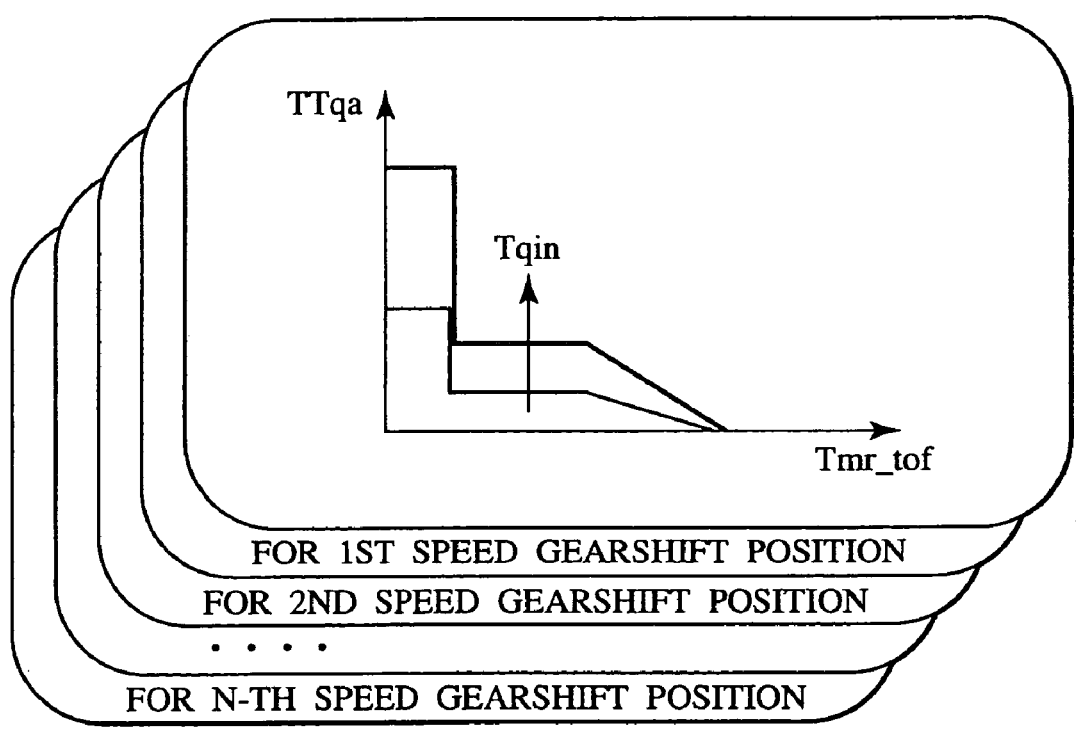

FIGS. 7(A1) through (G1) and (A2) through (G2) are timing charts of signals during an upshift from a 1st gearshift position to a 2nd gearshift position with varying input torque values when the control shown in FIGS. 5 and 6 is applied;

FIGS. 8(A1) through (G1) and (A2) through (G2) are timing charts of signals during an upshift from the 1st gearshift position to the 2nd gearshift position, and from the 2nd gearshift position to a 3rd gearshift position when the control shown in FIGS. 5 and 6 is applied;

FIG. 9 is a flowchart showing control provided in a second assist clutch torque release control shown in FIG. 3;

FIGS. 10(A1) through (G1) are timing charts of signals during an upshift from the 1st gearshift position to the 2nd gearshift position when the control shown in FIG. 9 is applied;

FIG. 11 is a flowchart showing control provided in a third assist clutch torque release control shown in FIG. 3;

FIG. 12 is a table of a target transmitting torque of FIG. 11;

FIGS. 13(A1) through (G1) are timing charts of signals during an upshift from the 1st gearshift position to the 2nd gearshift position when the control shown in FIGS. 11 and 12 is applied;

FIG. 14 is a second table of a target transmitting torque of FIG. 11; and

Figure 15:
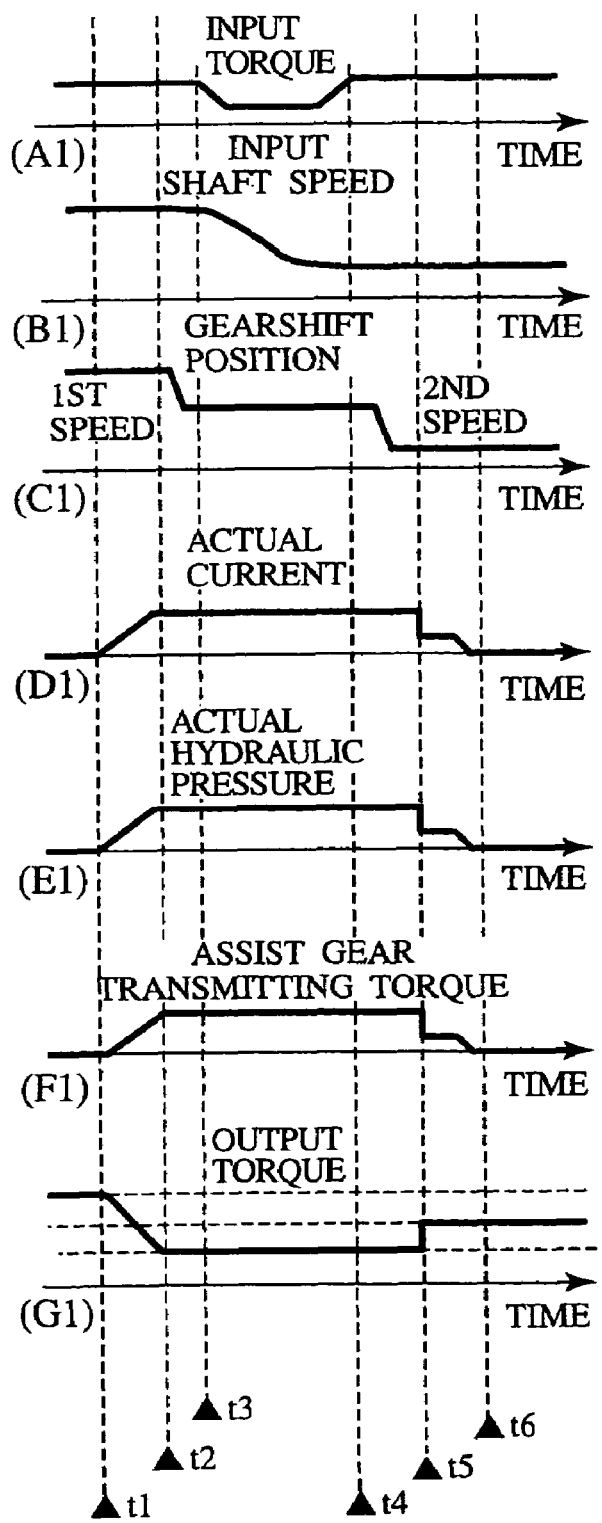

FIGS. 15(A1) through (G1) are timing charts of signals during an upshift from the 1st gearshift position to the 2nd gearshift position when the control shown in FIGS. 11 and 14 is applied.

DETAILED DESCRIPTION OF THE PREFERRED EMBODIMENTS

Preferred embodiments of the present invention will be described with reference to the accompanying drawings.

A first arrangement of a motor vehicle control system according to a preferred embodiment of the present invention will be described with reference to FIG. 1.

Figure 1:
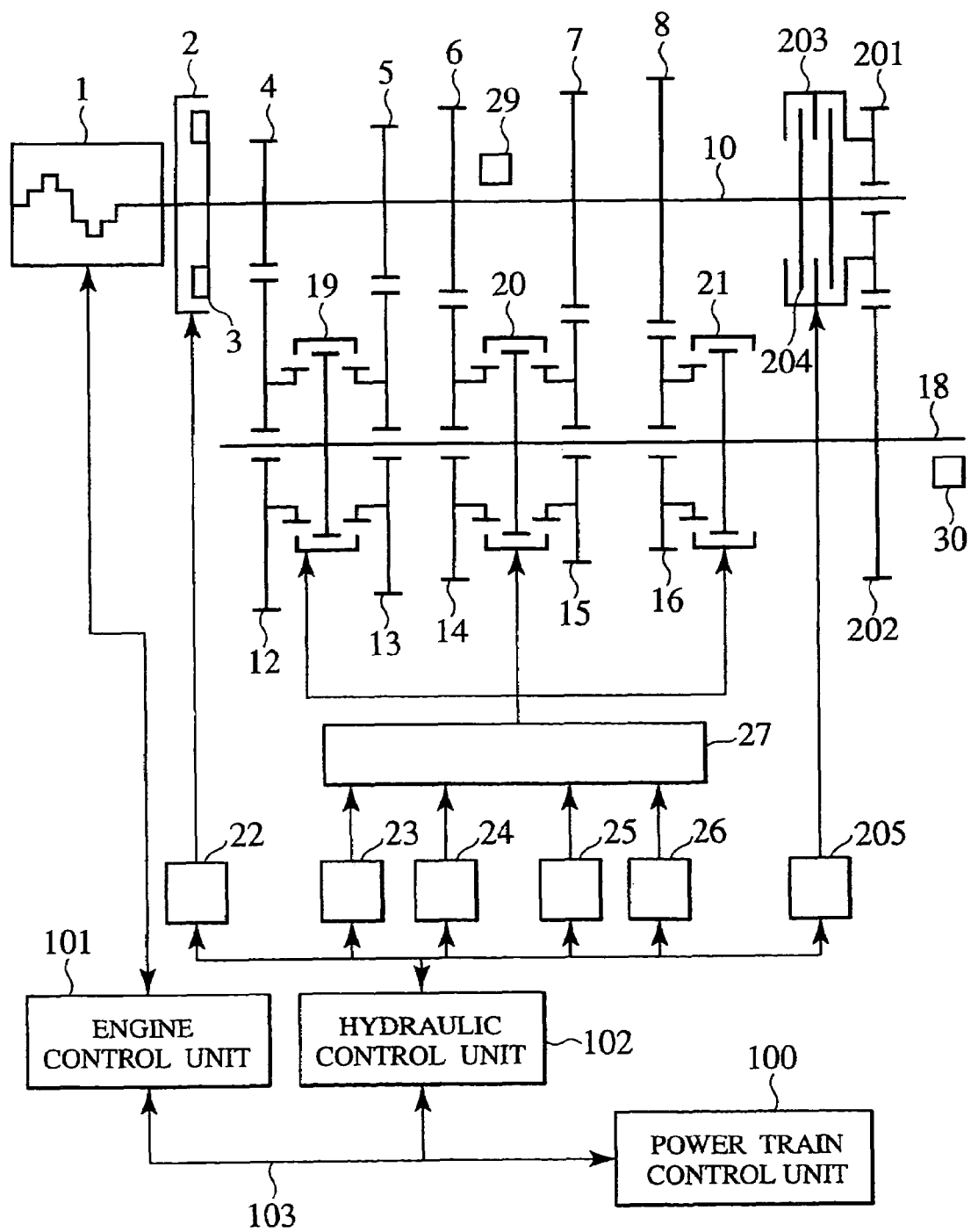
FIG. 1 is a diagram showing an overall configuration of an automated manual transmission according to a preferred embodiment of the present invention.

FIG. 1 is a skeleton diagram showing a first system configuration of a motor vehicle control system according to a preferred embodiment of the present invention. The system includes an engine 1 as a driving power source, an engine speed sensor (not shown) measuring a speed of the engine 1, a device regulating an engine torque (not shown; for example, an electronic controlled throttle), and a fuel injection system (not shown) for injecting the amount of fuel corresponding to the amount of intake air. Controlling the amount of intake air, the amount of fuel, ignition timing, and the like using an engine control unit 101 allows the torque of the engine 1 to be controlled accurately. The driving power source is not limited only to a gasoline engine as in the above example. A diesel engine, a natural gas engine, an electric motor, or the like perfectly serves the purpose.

An input shaft clutch input disc 2 is coupled to the engine 1. The torque of the engine 1 can be transmitted to, or shut off from, a transmission input shaft 10 by engaging the input shaft clutch input disc 2 with, or releasing the same from, an input shaft clutch output disc 3. A dry type single plate clutch is generally used as an input shaft clutch. Any type of friction transmission mechanisms can still be used, including a wet type multiple disc clutch and an electromagnetic clutch. The transmission input shaft 10 is provided with a first drive gear 4, a second drive gear 5, a third drive gear 6, a fourth drive gear 7, a fifth drive gear 8, a reverse drive gear (not shown), and a seventh drive gear 201.

A hydraulically driven actuator 22 is used for controlling a thrust force (an input shaft clutch torque) between the input shaft clutch input disc 2 and the input shaft clutch output disc 3. Regulating the thrust force (the input shaft clutch torque) allows an output from the engine 1 to be transmitted to, or shut off from, the transmission input shaft 10.

The first drive gear 4, the second drive gear 5, the third drive gear 6, the fourth drive gear 7, the fifth drive gear 8, and the reverse drive gear are secured in position. The seventh drive gear 201, on the other hand, is rotatably mounted on the transmission input shaft 10. There is also provided a sensor 29 for detecting the speed of the transmission input shaft 10. The sensor 29 functions as a system for detecting an input shaft speed.

A transmission output shaft 18 is provided with a first driven gear 12, a second driven gear 13, a third driven gear 14, a fourth driven gear 15, a fifth driven gear 16, and a reverse driven gear (not shown), rotatably mounted thereon. A seventh driven gear 202 is fixed onto the transmission output shaft 18. The first driven gear 12 is in mesh with the first drive gear 4. The second driven gear 13 is in mesh with the second drive gear 5. The third driven gear 14 is in mesh with the third drive gear 6. The fourth driven gear 15 is in mesh with the fourth drive gear 7. The fifth driven gear 16 is in mesh with the fifth drive gear 8. The reverse driven gear (not shown) is in mesh with the reverse drive gear through a reverse rotation gear (not shown). The seventh driven gear 202 is in mesh with the seventh drive gear 201.

A first meshing gearing 19 is provided as a meshing gearing between the first driven gear 12 and the second driven gear 13. The first meshing gearing 19 causes the first driven gear 12 to be engaged with the transmission output shaft 18. Or, the first meshing gearing 19 causes the second driven gear 13 to be engaged with the transmission output shaft 18.

Rotating torque transmitted from the first drive gear 4 or the second drive gear 5 to the first driven gear 12 or the second driven gear 13 is therefore transmitted to the first meshing gearing 19. The rotating torque is thereby transmitted to the transmission output shaft 18 through the first meshing gearing 19.

A second meshing gearing 20 is provided as a meshing gearing between the third driven gear 14 and the fourth driven gear 15. The second meshing gearing 20 causes the third driven gear 14 to be engaged with the transmission output shaft 18. Or, the second meshing gearing 20 causes the fourth driven gear 15 to be engaged with the transmission output shaft 18.

Rotating torque transmitted from the third drive gear 6 or the fourth drive gear 7 to the third driven gear 14 or the fourth driven gear 15 is therefore transmitted to the second meshing gearing 20. The rotating torque is thereby transmitted to the transmission output shaft 18 through the second meshing gearing 20.

A third meshing gearing 21 is provided as a meshing gearing between the fifth driven gear 16 and the reverse driven gear (not shown). The third meshing gearing 21 causes the fifth driven gear 16 to be engaged with the transmission output shaft 18. Or, the third meshing gearing 21 causes the reverse driven gear to be engaged with the transmission output shaft 18.

Rotating torque transmitted from the fifth drive gear 8 or the reverse drive gear to the fifth driven gear 16 or the reverse driven gear is therefore transmitted to the third meshing gearing 21. The rotating torque is thereby transmitted to the transmission output shaft 18 through the third meshing gearing 21.

The meshing gearing 19, 20, 21 described above may be a constant-mesh type. The gearing may even be a clutch provided with a friction transmission mechanism that is used to accomplish rotation synchronization for meshing (what is called a synchromesh).

To transmit the rotating torque of the transmission input shaft 10 to the first meshing gearing 19, the second meshing gearing 20, or the third meshing gearing 21, the following engagement must be effected. Specifically, either one of the first meshing gearing 19, the second meshing gearing 20, and the third meshing gearing 21 is moved in an axial direction of the transmission output shaft 18, thereby bringing the meshing gearing into engagement with any one of the first driven gear 12, the second driven gear 13, the third driven gear 14, the fourth driven gear 15, the fifth driven gear 16, and the reverse driven gear. To bring any one of the first driven gear 12, the second driven gear 13, the third driven gear 14, the fourth driven gear 15, the fifth driven gear 16, and the reverse driven gear into engagement with the transmission output shaft 18, either the first meshing gearing 19, the second meshing gearing 20, or the third meshing gearing 21 is to be moved. To move either the first meshing gearing 19, the second meshing gearing 20, or the third meshing gearing 21, a shift/select mechanism 27 is operated using a shift first actuator 23, a shift second actuator 24, a select first actuator 25, and a select second actuator 26.

Bringing either one of the first meshing gearing 19, the second meshing gearing 20, and the third meshing gearing 21 into engagement with any one of the first driven gear 12, the second driven gear 13, the third driven gear 14, the fourth driven gear 15, the fifth driven gear 16, and the reverse driven gear allows the rotating torque of the transmission input shaft 10 to be transmitted to the transmission output shaft 18 through either the first meshing gearing 19, the second meshing gearing 20, or the third meshing gearing 21. In addition, there is provided a sensor 30 for detecting the speed of the transmission output shaft 18. The sensor 30 functions as a system for detecting an output shaft speed.

The shift first actuator 23 and the shift second actuator 24, and the select first actuator 25 and the select second actuator 26 may be configured using a solenoid valve, an electric motor, or the like.

The shift/select mechanism 27 may be configured using a shifter rail, a shifter fork, and the like. The shift/select mechanism 27 may even be formed into a drum type. The shift/select mechanism 27 is also provided with a position holding mechanism (not shown) for holding gear positions, thereby preventing gears from coming off position during running.

An assist clutch 203, 204 is also provided as one type of the transmitting torque variable mechanism. An assist clutch input disc 203 and an assist clutch output disc 204 are engaged with each other when the seventh drive gear 201 is connected to the assist clutch input disc 203 and the transmission input shaft 10 is connected to the assist clutch output disc 204. This allows the torque of the seventh driven gear 202 to be transmitted to the transmission output shaft 18.

A hydraulically operated actuator 205 is used for controlling a thrust force (or an assist clutch torque) between the assist clutch input disc 203 and the assist clutch output disc 204. The output from the engine 1 can be transmitted or shut down by regulating this thrust force (the assist clutch torque).

The transmitting torque variable mechanism may be formed using a friction transmission mechanism, a motor-generator, or the like. The friction transmission mechanism refers to a mechanism that generates a frictional force using a thrust force of a friction surface, thereby transmitting torque. A typical application of the friction transmission mechanism is a friction clutch. The friction clutch is available in several different varieties. The varieties include the dry type single plate clutch, a dry type multi-plate clutch, the wet type multiple disc clutch, an electromagnetic clutch, and the like.

The control system in accordance with the preferred embodiment of the present invention uses the wet type multiple disc clutch as the friction transmission mechanism for the assist clutch 203, 204. Any other type of transmitting torque variable mechanism can be used.

As explained in the foregoing, the rotating torque of the transmission input shaft 10 is transmitted from the first drive gear 4, the second drive gear 5, the third drive gear 6, the fourth drive gear 7, the fifth drive gear 8, the reverse drive gear, and the seventh drive gear 201 through the first driven gear 12, the second driven gear 13, the third driven gear 14, the fourth driven gear 15, the fifth driven gear 16, the reverse driven gear, and the seventh driven gear 202 to the transmission output shaft 18. The rotating torque is then transmitted to an axle (not shown) through a differential gear (not shown) connected to the transmission output shaft 18.

The input shaft clutch actuator 22 controls the thrust force (the input shaft clutch torque) between the input shaft clutch input disc 2 and the input shaft clutch output disc 3. The assist clutch actuator 205 controls the thrust force (the assist clutch torque) between the assist clutch input disc 203 and the assist clutch output disc 204. A hydraulic pressure control unit 102 controls the hydraulic pressure for the input shaft clutch actuator 22 and the assist clutch actuator 205 as detailed in the following. Specifically, the hydraulic pressure control unit 102 controls a current flowing through a solenoid valve (not shown) provided for each actuator. A stroke of a hydraulic cylinder (not shown) provided for each actuator is thereby adjusted to achieve an intended level of hydraulic pressure for each actuator. The transmitting torque of each clutch is thus controlled.

The hydraulic pressure control unit 102 also controls a current flowing through a solenoid valve (not shown) provided for the select first actuator 25 and the select second actuator 26. A stroke of a hydraulic cylinder (not shown) provided for each of these actuators is thereby adjusted to achieve an intended level of hydraulic pressure for each actuator. Either the first meshing gearing 19, the second meshing gearing 20, or the third meshing gearing 21 is thus selected and moved as necessary.

Further, the hydraulic pressure control unit 102 controls a current flowing through a solenoid valve (not shown) provided for each of the shift first actuator 23 and the shift second actuator 24. A stroke of a hydraulic cylinder (not shown) provided for each of these actuators is thereby adjusted to achieve an intended level of hydraulic pressure for each actuator. A load for operating the first meshing gearing 19, the second meshing gearing 20, and the third meshing gearing 21 can thus be controlled.

The control system in accordance with the preferred embodiment of the present invention uses hydraulic actuators for the shift first actuator 23 and the shift second actuator 24, and the select first actuator 25 and the select second actuator 26, all used for driving the shift/select mechanism 27. Use of an electric actuator operated by an electric motor or the like is nonetheless possible.

A single actuator may be used instead of the shift first actuator 23 and the shift second actuator 24. Further, a single actuator may also be used instead of the select first actuator 25 and the select second actuator 26. A shifter rail, a shifter fork, and the like may be used to form a mechanism for operating the first meshing gearing 19, the second meshing gearing 20, and the third meshing gearing 21. Or a drum type, or any other type of mechanism may be formed for moving the dog clutch 19, 20, 21.

The control system in accordance with the preferred embodiment of the present invention uses hydraulic actuators for the input shaft clutch actuator 22 and the assist clutch actuator 205. Use of an electric actuator operated by an electric motor or the like is nonetheless possible.

Controlling the amount of intake air, the amount of fuel, ignition timing, and the like using the engine control unit 101 allows torque of the engine 1 to be controlled accurately. A power train control unit 100 controls the hydraulic pressure control unit 102 and the engine control unit 101. The power train control unit 100, the engine control unit 101, and the hydraulic pressure control unit 102 exchange information between each other using communications means 103.

The control system in accordance with the preferred embodiment of the present invention uses hydraulic actuators. This results in the hydraulic pressure control unit 102 being used for controlling the hydraulic actuators. With the electric actuator operated by the electric motor or the like, however, an electric motor control unit is to be used instead of the hydraulic pressure control unit 102.

Figure 2:
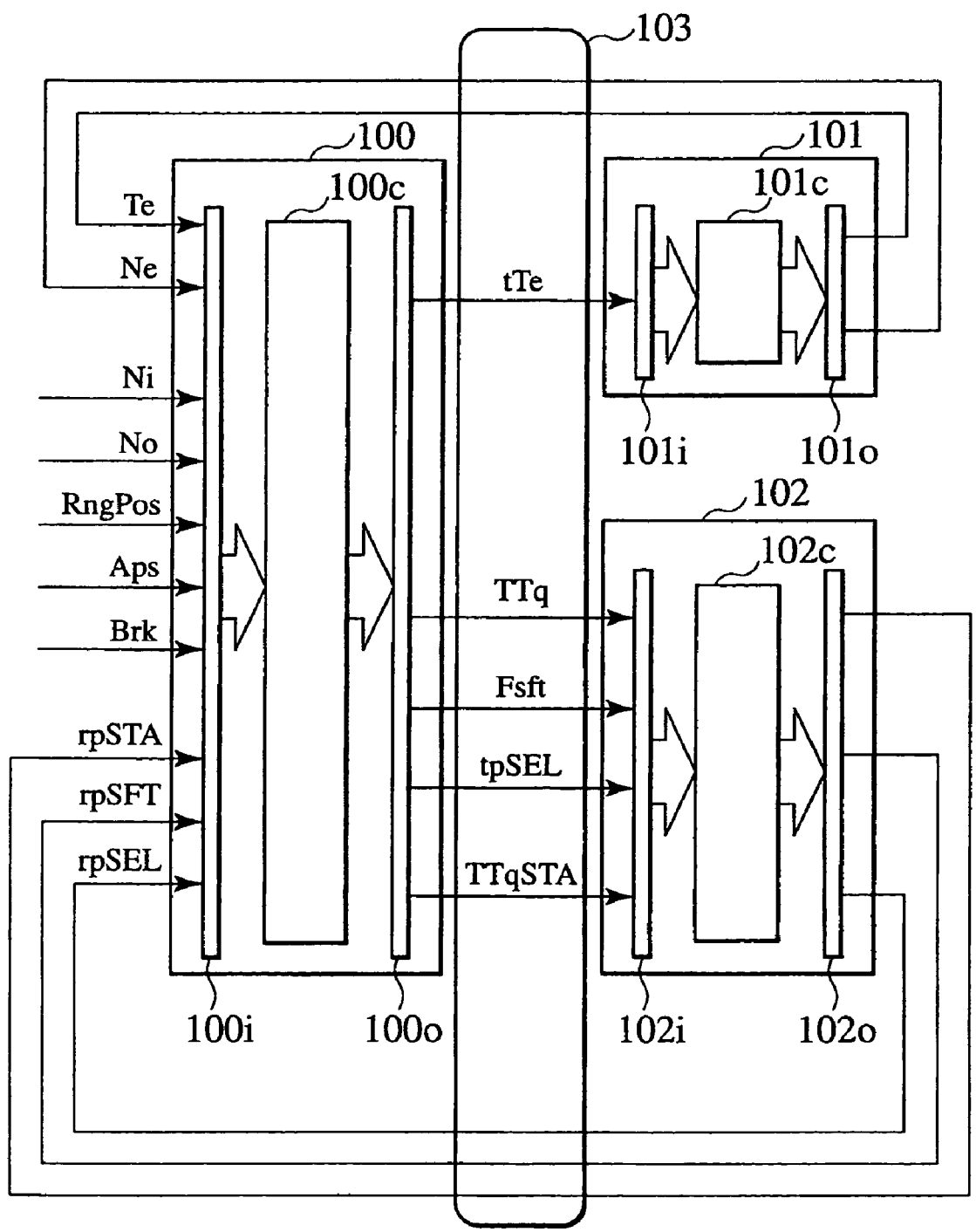
FIG. 2 is a block diagram showing input/output (I/O) signals transferred in the control system according to the preferred embodiment of the present invention shown in FIG. 1.

FIG. 2 is a block diagram showing input/output (I/O) signals sent and received by the power train control unit 100, the engine control unit 101, and the hydraulic pressure control unit 102 through the communications means 103. The power train control unit 100 is formed as a control unit including an input portion 100i, an output portion 100o, and a computer 100c. Similarly, the engine control unit 101 is formed as a control unit including an input portion 101i, an output portion 101o, and a computer 101c. The hydraulic pressure control unit 102 is also formed as a control unit including an input portion 102i, an output portion 102o, and a computer 102c. An engine torque command value tTe is sent from the power train control unit 100 to the engine control unit 101 using the communications means 103. To achieve tTe, the engine control unit 101 controls the amount of intake air, the amount of fuel, ignition timing (not shown), and the like of the engine 1. There are provided inside the engine control unit 101 means (not shown) for detecting an engine torque that serves as an input torque for the transmission. The engine control unit 101 detects a speed Ne of the engine 1 and an engine torque Te generated by the engine 1. The engine control unit 101 then sends signals representing the information to the power train control unit 100 using the communications means 103. A torque sensor may be used for the engine torque detection means. Another possible approach for the engine torque detection means is to use estimation means making an estimate based on engine parameters, such as an injector injection pulse width, an intake pipe vacuum, the engine speed, and the like.

The power train control unit 100 sends signals representing the following information to the hydraulic pressure control unit 102: an input shaft clutch target torque TTqSTA, a target shift load Fsft, a target select position tpSEL, and an assist clutch target torque TTqa. The hydraulic pressure control unit 102 controls the input shaft clutch actuator 22 so as to achieve the input shaft clutch target torque TTqSTA. The input shaft clutch input disc 2 and the input shaft clutch output disc 3 are thereby engaged with, or released from, each other.

To achieve the target shift load Fsft and the target select position tpSEL, the hydraulic pressure control unit 102 controls the shift first actuator 23, the shift second actuator 24, the select first actuator 25, and the select second actuator 26, thereby operating the shift/select mechanism 27. A shift position or a select position are thereby controlled to eventually engaged or release the first meshing gearing 19, the second meshing gearing 20, and the third meshing gearing 21. In addition, to achieve the assist clutch target torque TTqa, the hydraulic pressure control unit 102 controls the assist clutch actuator 205 to engage or release the assist clutch input disc 203 and the assist clutch output disc 204.

The hydraulic pressure control unit 102 detects a position signal rpSTA, a shift position signal rpSFT, and a select position signal rpSEL indicating that the input shaft clutch is engaged or released. The hydraulic pressure control unit 102 transmits these signals to the power train control unit 100.

Signals representing an input shaft speed Ni and an output shaft speed No are applied to the power train control unit 100 from the input shaft speed sensor 29 and the output shaft speed sensor 30, respectively. In addition to these signals, a range position signal RngPos indicating a shift lever position such as a P range, an R range, an N range, a D range, or the like, a signal representing an accelerator pedal depression amount Aps, and an ON/OFF signal Brk from a brake switch for detecting whether or not a brake pedal is depressed are applied to the power train control unit 100. If, for example, a driver places the shift lever in the D range or the like and depresses an accelerator pedal, the power train control unit 100 determines that the driver intends to start a vehicle or accelerate the vehicle. If, for example, the driver depresses the brake pedal, the power train control unit 100 determines that the driver intends to decelerate or stop the vehicle. The power train control unit 100 then sets the engine torque command value tTe, the input shaft clutch target torque TTqSTA, the target shift load Fsft, and the target select position tpSEL so as to achieve the driver's intention.

Further, a gearshift position is set from a vehicle speed Vsp calculated from the output shaft speed No and the accelerator pedal depression amount Aps. To execute a gearshift operation into the gearshift position thus set, the engine torque command value tTe, the input shaft clutch target torque TTqSTA, the target shift load Fsft, the target select position tpSEL, and the assist clutch target torque TTqa are then set.

Specific control operations performed during the gearshift in the motor vehicle control system according to the preferred embodiment of the present invention will be described with reference to FIGS. 3 through 13.

Overall control operations performed during the gearshift in the motor vehicle control system according to the preferred embodiment of the present invention will first be described with reference to FIG. 3.

FIG. 3 is a flowchart showing control operations performed during the gearshift in the motor vehicle control system according to the preferred embodiment of the present invention. Specific operations of the gearshift control described hereunder that have previously been programmed in the computer 100c of the power train control unit 100 are executed repeatedly at a predetermined cycle. That is, operations of steps 301 through 311 given in the following are executed by the power train control unit 100. In step 301, the power train control unit 100 reads parameters. In step 302, a gearshift operation is started by setting the gearshift position based on the vehicle speed Vsp and the accelerator pedal depression amount Aps. In step 303 (a release control phase), release control is executed to release the gear. In step 304, it is determined whether or not the release control is completed. If it is determined that the release control is completed, the control operation proceeds to step 305. If it is determined that the release control is yet to be completed, step 303 is re-executed. In step 305 (a rotation synchronization control phase), the assist clutch torque is controlled so as to make the input speed synchronized with a speed (a target speed) corresponding to the next gearshift position. In step 306, it is determined whether or not the rotation synchronization control is completed. If it is determined that the rotation synchronization control is completed, the control operation proceeds to step 307. If it is determined that the rotation synchronization control is yet to be completed, step 305 is re-executed. In step 307 (an engagement control phase), gear engagement control is executed. In step 308, it is determined whether or not the engagement control is completed. If it is determined that the engagement control is completed, the control operation proceeds to step 309. If it is determined that the engagement control is yet to be completed, step 307 is re-executed. In step 309 (an assist clutch release phase), an assist clutch torque release control is executed. In step 310, it is determined whether or not the assist clutch torque release control is completed. If it is determined that the assist clutch torque release control is completed, the control operation proceeds to step 311. If it is determined that the assist clutch torque release control is yet to be completed, step 310 is re-executed. The assist clutch torque release control is completed if the assist clutch target torque is 0.

In step 311 (a gearshift termination phase), the gearshift control is terminated.

Details of a timer indicating an elapsed time of specific control operations performed during the gearshift in the motor vehicle control system according to the preferred embodiment of the present invention will be described with reference to FIG. 4.

Figure 4:
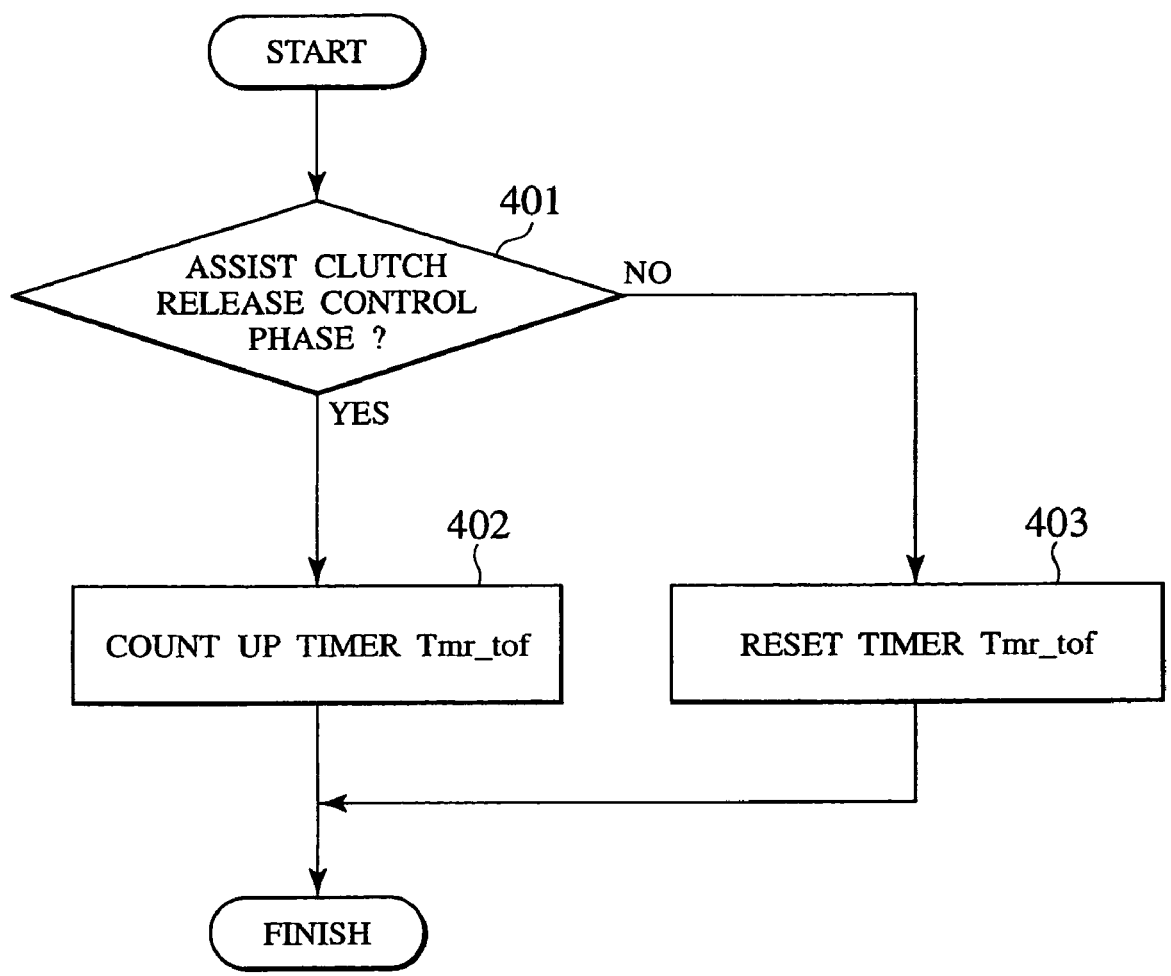
FIG. 4 is a flowchart showing operations of an assist clutch transmitting torque release control timer shown in FIG. 3.

FIG. 4 is a flowchart showing details of the timer indicating an elapsed time of specific control operations performed during the gearshift in the motor vehicle control system according to the preferred embodiment of the present invention.

Specific details of the timer described hereunder that have previously been programmed in the computer 100c of the power train control unit 100 are executed repeatedly at a predetermined cycle. That is, operations of steps 401 and 402 given in the following are executed by the power train control unit 100.

In step 401, it is determined whether or not the assist clutch torque release control is being provided. If it is determined that the assist clutch torque release control is being provided, the control operation proceeds to step 402. In step 402, an assist clutch torque release control timer Tmr_tof counts up. If it is determined that the assist clutch torque release control is not being provided, the control operation proceeds to step 403. In step 403, the assist clutch torque release control timer Tmr_tof is reset.

Operations of a first control in step 309 (the assist clutch release control phase) performed as part of the gearshift control in the motor vehicle control system according to the preferred embodiment of the present invention will be described with reference to FIGS. 5 and 6.

FIG. 5 is a flowchart showing control provided in step 309 (the assist clutch torque release control phase) of FIG. 3. In step 501, parameters are read. In step 502, it is determined whether or not the current operation is immediately after the start of the assist clutch torque release control phase. If the assist clutch torque release control phase timer Tmr_tof is 0, the control operation proceeds to step 503. If the assist clutch torque release control phase timer Tmr_tof is not 0, the control operation proceeds to step 504. In step 503, an assist clutch torque release speed dTTqa is calculated. The assist clutch torque release speed dTTqa in step 503 is a function of a transmission input torque Tqin. In step 504, an assist clutch target torque at assist clutch torque release is calculated.

FIG. 6 shows typical setting values for the function f1 of step 503 shown in FIG. 5. It is desirable that the setting value for the function f1 of step 503 be set to a greater value as the transmission input torque Tqin becomes greater. It is also desirable that the function f1 be set uniquely for each of different gearshift positions. In step 503, the assist clutch torque release speed dTTqa is calculated from the transmission input torque Tqin. Instead of using the transmission input torque Tqin, the assist clutch torque release speed dTTqa may be calculated from an accelerator opening, a vehicle acceleration, a step in a transmission output torque as calculated using transmission input torque×reduction gear ratio after gearshift—transmission input torque×assist gear ratio, a quantity of heat generated by the assist clutch, and the like.

FIGS. 7(A1) through (G2) are timing charts showing conditions of the first control performed as part of the gearshift control shown in FIGS. 5 and 6.

FIG. 7(A1) and FIG. 7(A2) represent a transmission input torque transmitted to the transmission input shaft 10 shown in FIG. 1. FIG. 7(B1) and FIG. 7(B2) represent the speed of the transmission input shaft 10 shown in FIG. 1. FIG. 7(C1) and FIG. 7(C2) represent a position (a shift position) of the first meshing gearing 19 shown in FIG. 1. FIG. 7(D1) and FIG. 7(D2) represent a command current applied to the hydraulic pressure control unit 102 driving the assist actuator 205 shown in FIG. 1. FIG. 7(E1) and FIG. 7(E2) represent an actual hydraulic pressure for driving the assist actuator 205 shown in FIG. 1. FIG. 7(F1) and FIG. 7(F2) represent the assist clutch torque. FIG. 7(G1) and FIG. 7(G2) represent the output torque of the transmission output shaft 18 shown in FIG. 1. The abscissa represents time.

FIGS. 7(A1) through 7(G1) show the transmission input torque, the input shaft speed, the shift position, the command current, the actual hydraulic pressure, the assist clutch torque, and the transmission output torque, respectively, at different timings during a gearshift from the combination of gears 4 and 12 (hereinafter referred to as a "1st speed") to the combination of gears 5 and 13 (hereinafter referred to as a "2nd speed").

Similarly, FIGS. 7(A2) through 7(G2) show the transmission input torque, the input shaft speed, the shift position, the command current, the actual hydraulic pressure, the assist clutch torque, and the transmission output torque, respectively, at different timings during the gearshift from the 1st speed to the 2nd speed. The values of the transmission input torque shown in FIGS. 7(A2) through 7(G2) differ from those shown in FIGS. 7(A1) through 7(G1).

When a gearshift command to the 2nd speed is issued at time t1 during running in the 1st speed, gearshift control is started. When the command current is gradually increased as shown in a period of time from time t1 to time t2 of FIG. 7(D1) and FIG. 7(D2), the actual hydraulic pressure gradually increases as shown in the period of time from time t1 to time t2 of FIG. 7(E1) and FIG. 7(E2). The assist clutch torque also gradually increases as shown in the period of time from time t1 to time t2 of FIG. 7(F1) and FIG. 7(F2).

At this time, the transmission output torque gradually decreases as shown in the period of time from time t1 to time t2 of FIG. 7(G1) and FIG. 7(G2). Then at time t2, the first meshing gearing 19, which has so far been engaged with the 1st speed side, is set into a state to be released. This is because torque transmitted by the gears 201 and 202 causes torque transmitted by the gears 4 and 12 to be decreased to a value that allows the first meshing gearing 19 to be released.

When the first meshing gearing 19 is in the state to be released, the actuator 27 is controlled so as to release the first meshing gearing 19, which has been engaged with the 1st speed side, bringing the first meshing gearing 19 into a neutral position to initiate an actual gearshift, as shown in a period of time from time t2 to time t3 in FIG. 7(C1) and FIG. 7(C2).

When the first meshing gearing 19 is in the neutral position, the assist clutch torque is controlled to bring the input shaft speed to a level corresponding to the 2nd speed. When the input shaft speed reaches a level corresponding to the 2nd speed as shown at time t4 of FIG. 7(B1) and FIG. 7(B2), the first meshing gearing 19 is allowed to engage with the 2nd speed side as shown in a period of time from time t4 to time t5 of FIG. 7(B1) and FIG. 7 (B2).

When the command current is gradually decreased as shown in a period of time from time t5 to time t6, during which the first meshing gearing 19 is engaged in the 2nd speed, the actual hydraulic pressure gradually decreases as shown in the period of time from time t5 to time t6 of FIG. 7(E1) and FIG. 7(E2). The assist clutch torque also gradually decreases as shown in the period of time from time t5 to time t6 of FIG. 7(F1) and FIG. 7 (F2). At this time, the transmission output torque gradually increases as shown in the period of time from time t5 to time t6 of FIG. 7(G1) and FIG. 7(G2). When the release of the assist clutch torque is completed at time t6, torque is then transmitted only with the 2nd speed gear.

The command current applied to the hydraulic pressure control unit 102 that drives the assist actuator 205 of FIG. 1 is controlled so that the assist clutch torque release speed changes as shown in a portion encircled in FIG. 7(F1) and in a portion encircled in FIG. 7(F2). This reduces axle vibration at the end of the gearshift in each of different cases of varying values of the transmission input torque.

FIGS. 8(A1) through (G2) are timing charts showing conditions of a second control performed as part of the gearshift control shown in FIGS. 5 and 6.

FIGS. 8(A1) and FIG. 8(A2) represent the transmission input torque transmitted to the transmission input shaft 10 shown in FIG. 1. FIG. 8(B1) and FIG. 8(B2) represent the speed of the transmission input shaft 10 shown in FIG. 1. FIG. 8(C1) represents the position (the shift position) of the first meshing gearing 19 shown in FIG. 1. FIG. 8(C2) represents the position (the shift position) of the first meshing gearing 19 and the second meshing gearing 20 shown in FIG. 1. FIG. 8(D1) and FIG. 8(D2) represent the command current applied to the hydraulic pressure control unit 102 driving the assist actuator 205 shown in FIG. 1. FIG. 8(E1) and FIG. 8(E2) represent the actual hydraulic pressure for driving the assist actuator 205 shown in FIG. 1. FIG. 8(F1) and FIG. 8(F2) represent the assist clutch torque. FIG. 8(G1) and FIG. 8(G2) represent the output torque of the transmission output shaft 18 shown in FIG. 1. The abscissa represents time.

FIGS. 8(A1) through 8(G1) show the transmission input torque, the input shaft speed, the shift position, the command current, the actual hydraulic pressure, the assist clutch torque, and the transmission output torque, respectively, at different timings during a gearshift from the 1st speed to the 2nd speed.

FIGS. 8(A2) through 8(G2) show the transmission input torque, the input shaft speed, the shift position, the command current, the actual hydraulic pressure, the assist clutch torque, and the transmission output torque, respectively, at different timings during the gearshift from the 2nd speed to the combination of gears 6 and 14 (hereinafter referred to as a "3rd speed").

When a gearshift command to the 2nd speed is issued at time t1 during running in the 1st speed, gearshift control is started. If a gearshift command to the 3rd speed is issued at time t1 during running in the 2nd speed, gearshift control is started. When the command current is gradually increased as shown in a period of time from time t1 to time t2 of FIG. 8 (D1) and FIG. 8(D2), the actual hydraulic pressure gradually increases as shown in the period of time from time t1 to time t2 of FIG. 8(E1) and FIG. 8(E2). The assist clutch torque also gradually increases as shown in the period of time from time t1 to time t2 of FIG. 8(F1) and FIG. 8(F2).

At this time, the transmission output torque gradually decreases as shown in the period of time from time t1 to time t2 of FIG. 8(G1) and FIG. 8(G2). Then at time t2, the first meshing gearing 19, which has so far been engaged with the 1st speed side, is set into a state to be released during the gearshift from the 1st speed to the 2nd speed. During the gearshift from the 2nd speed to the 3rd speed, the first meshing gearing 19, which has so far been engaged with the 2nd speed side, is set into a state to be released.

This is because torque transmitted by the gears 201 and 202 causes torque transmitted by the gears 4 and 12 to be decreased, during the gearshift from the 1st speed to the 2nd speed, to a value that allows the first meshing gearing 19 to be released. In addition, during the gearshift from the 2nd speed to the 3rd speed, on the other hand, the torque transmitted by the gears 201 and 202 causes torque transmitted by the gears 5 and 13 to be decreased to the value that allows the first meshing gearing 19 to be released.

When the first meshing gearing 19 and the second meshing gearing 20 are in the state to be released, the actuator 27 is controlled, during the gearshift from the 1st speed to the 2nd speed, so as to release the first meshing gearing 19, which has been engaged with the 1st speed side. The first meshing gearing 19 is thereby brought into a neutral position as shown in a period of time from time t2 to time t3 in FIG. 8(C1). Then, the assist clutch torque is controlled to bring the input shaft speed to a level corresponding to the 2nd speed. During the gearshift from the 2nd speed to the 3rd speed, on the other hand, the actuator 27 is controlled so as to release the first meshing gearing 19, which has been engaged with the 2nd speed side, thereby bringing the first meshing gearing 19 into a neutral position as shown in a period of time from time t2 to time t3 in FIG. 8(C2). Then, the assist clutch torque is controlled to bring the input shaft speed to a level corresponding to the 3rd speed.

During the gearshift from the 1st speed to the 2nd speed, when the input shaft speed reaches a level corresponding to the 2nd speed as shown at time t4 of FIG. 8(B1), the first meshing gearing 19 is allowed to engage with the 2nd speed side as shown in a period of time from time t4 to time t5 of FIG. 8(B1). During the gearshift from the 2nd speed to the 3rd speed, when the input shaft speed reaches a level corresponding to the 3rd speed as shown at time t4 of FIG. 8(B2), the second meshing gearing 20 is engaged with the 3rd speed side as shown in a period of time from time t4 to time t5 of FIG. 8(B2).

During the gearshift from the 1st speed to the 2nd speed, the command current is gradually decreased as shown in a period of time from time t5 to time t6, during which the first meshing gearing 19 is engaged with the 2nd speed. During the gearshift from the 2nd speed to the 3rd speed, on the other hand, the command current is gradually decreased as shown in a period of time from time t5 to time t6, during which the second meshing gearing 20 is engaged with the 3rd speed. The actual hydraulic pressure then gradually decreases as shown in the period of time from time t5 to time t6 of FIG. 8(E1) and FIG. 8(E2). The assist clutch torque also gradually decreases as shown in the period of time from time t5 to time t6 of FIG. 8(F1) and FIG. 8(F2). At this time, the transmission output torque gradually increases as shown in the period of time from time t5 to time t6 of FIG. 8(G1) and FIG. 8 (G2). When the release of the assist clutch torque is completed at time t6, torque is then transmitted only with the 2nd speed gear.

The command current applied to the hydraulic pressure control unit 102 that drives the assist actuator 205 of FIG. 1 is controlled so that the assist clutch torque release speed changes as shown in a portion encircled in FIG. 8(F1) and in a portion encircled in FIG. 8(F2). This reduces axle vibration at the end of the gearshift in each of different cases of varying reduction gear ratios at the end of the gearshift.

Operations of a second control in step 309 (the assist clutch torque release control phase) performed as part of the gearshift control in the motor vehicle control system according to the preferred embodiment of the present invention will be described with reference to FIG. 9.

FIG. 9 is a flowchart showing control provided in step 309 (the assist clutch torque release control phase) of FIG. 3. In step 901, parameters are read. In step 902, an actual transmission output torque RTqo is calculated. The actual transmission output torque RTqo may be directly detected using a torque sensor or estimated based on changes in the output shaft speed or the like. In step 903, it is determined whether or not the current operation is immediately after the start of the assist clutch torque release control phase. If the assist clutch torque release control phase timer Tmr_tof is 0, the control operation proceeds to step 904. If the assist clutch torque release control phase timer Tmr_tof is not 0, the control operation proceeds to step 906. In step 904, transmission output torque at the end of gearshift TTqo is calculated using the transmission input torque Tqin and a reduction gear ratio after the gearshift Gro. In step 905, the assist clutch target torque at assist clutch torque release TTqa is set to 0. In step 906, a transmission output torque deviation at the end of gearshift ETqo is calculated using the transmission output torque at the end of gearshift TTqo and the actual transmission output torque RTqo. In step 907, a feedback amount TTqaFB is calculated based on the transmission output torque deviation at the end of gearshift ETqo. In step 908, the assist clutch target torque at assist clutch torque release TTqa is set to TTqaFB.

FIGS. 10(A1) through (G1) are timing charts showing conditions of the gearshift control shown in FIG. 9. FIG. 10(A1) represents transmission input torque transmitted to the transmission input shaft 10 shown in FIG. 1. FIG. 10(B1) represents the speed of the transmission input shaft 10 shown in FIG. 1. FIG. 10(C1) represents a position (a shift position) of the first meshing gearing 19 shown in FIG. 1. FIG. 10(D1) represents a command current applied to the hydraulic pressure control unit 102 driving the assist actuator 205 shown in FIG. 1. FIG. 10(E1) represents an actual hydraulic pressure for driving the assist actuator 205 shown in FIG. 1. FIG. 10(F1) represents the assist clutch torque. FIG. 10 (G1) represents the output torque of the transmission output shaft 18 shown in FIG. 1. The abscissa represents time.

FIGS. 10(A1) through 10(G1) show the transmission input torque, the input shaft speed, the shift position, the command current, the actual hydraulic pressure, the assist clutch torque, and the transmission output torque, respectively, at different timings during a gearshift from the 1st speed to the 2nd speed.

When a gearshift command to the 2nd speed is issued at time t1 during running in the 1st speed, gearshift control is started. When the command current is gradually increased as shown in a period of time from time t1 to time t2 of FIG. 10(D1), the actual hydraulic pressure gradually increases as shown in the period of time from time t1 to time t2 of FIG. 10 (E1). The assist clutch torque also gradually increases as shown in the period of time from time t1 to time t2 of FIG. 10(F1). At this time, the transmission output torque gradually decreases as shown in the period of time from time t1 to time t2 of FIG. 10(G1). Then at time t2, the first meshing gearing 19, which has so far been engaged with the 1st speed side, is set into a state to be released. This is because torque transmitted by the gears 201 and 202 causes torque transmitted by the gears 4 and 12 to be decreased to a value that allows the first meshing gearing 19 to be released.

When the first meshing gearing 19 is in the state to be released, the actuator 27 is controlled so as to release the first meshing gearing 19, which has been engaged with the 1st speed side. The first meshing gearing 19 is thereby brought into a neutral position to initiate an actual gearshift, as shown in a period of time from time t2 to time t3 in FIG. 10(C1). When the first meshing gearing 19 is in the neutral position, the assist clutch torque is controlled to bring the input shaft speed to a level corresponding to the 2nd speed.

When the input shaft speed reaches a level corresponding to the 2nd speed as shown at time t4 of FIG. 10(B1), the first meshing gearing 19 is allowed to engage with the 2nd speed side as shown in a period of time from time t4 to time t5 of FIG. 10(B1). When the command current is decreased as shown in a period of time from time t5 to time t6, during which the first meshing gearing 19 is engaged with the 2nd speed, the actual hydraulic pressure decreases as shown in the period of time from time t5 to time t6 of FIG. 10(E1). The assist clutch torque also decreases as shown in the period of time from time t5 to time t6 of FIG. 10(F1). At this time, the transmission output torque gradually increases as shown in the period of time from time t5 to time t6 of FIG. 10(G1). When the release of the assist clutch torque is completed at time t6, torque is then transmitted only with the 2nd speed gear. This eliminates torque vibration in the transmission output, thereby reducing axle vibration at the end of the gearshift.

Operations of a third control in step 309 (the assist clutch torque release control phase) performed as part of the gearshift control in the motor vehicle control system according to the preferred embodiment of the present invention will be described with reference to FIGS. 11 and 12.

FIG. 11 is a flowchart showing control provided in step 309 (the assist clutch torque release control phase) of FIG. 3. In step 1101, parameters are read. In step 1102, it is determined whether or not the current operation is immediately after the start of the assist clutch torque release control phase. If the assist clutch torque release control phase timer Tmr_tof is 0, the control operation proceeds to step 1103. If the assist clutch torque release control phase timer Tmr_tof is not 0, the control operation proceeds to step 1105. In step 1103, the assist clutch target torque at assist clutch torque release TTqa is calculated. In step 1104, the assist clutch target torque at assist clutch torque release calculation is preformed. The assist clutch target torque at assist clutch torque release TTqa is a function of the transmission input torque Tqin and the assist clutch torque release control phase timer Tmr_tof.

FIG. 12 shows a typical first setting value for the function f2 of step 1104 shown in FIG. 11. The first setting value of the function f2 in step 1104 is the same as that of the assist clutch target torque at assist clutch torque release calculated in steps 902 through 908 of FIG. 9.

This eliminates the need for detecting the actual transmission output torque. The same effect can therefore be produced even without using an expensive torque sensor. The approach lightens calculation load, since there is no need of calculating the feedback amount as calculated in steps 1406 and 1407 of FIG. 9.

It is desirable that the first setting value of the function f2 in step 1104 be set to a greater value as the transmission input torque Tqin becomes greater. It is also desirable that the function f2 be set uniquely for each of different gearshift positions when releasing the assist gear clutch torque.

FIGS. 13(A1) through (G1) are timing charts showing conditions of the gearshift control shown in FIGS. 11 and 12. FIG. 13(A1) represents transmission input torque transmitted to the transmission input shaft 10 shown in FIG. 1. FIG. 13(B1) represents the speed of the transmission input shaft 10 shown in FIG. 1. FIG. 13(C1) represents a position (a shift position) of the first meshing gearing 19 shown in FIG. 1. FIG. 13(D1) represents a command current applied to the hydraulic pressure control unit 102 driving the assist actuator 205 shown in FIG. 1. FIG. 13(E1) represents an actual hydraulic pressure for driving the assist actuator 205 shown in FIG. 1. FIG. 13(F1) represents the assist clutch torque. FIG. 13 (G1) represents the output torque of the transmission output shaft 18 shown in FIG. 1. The abscissa represents time.

FIGS. 13(A1) through 13(G1) show the transmission input torque, the input shaft speed, the shift position, the command current, the actual hydraulic pressure, the assist clutch torque, and the transmission output torque, respectively, at different timings during a gearshift from the 1st speed to the 2nd speed.

When a gearshift command to the 2nd speed is issued at time t1 during running in the 1st speed, gearshift control is started. When the command current is gradually increased as shown in a period of time from time t1 to time t2 of FIG. 13(D1), the actual hydraulic pressure gradually increases as shown in the period of time from time t1 to time t2 of FIG. 13 (E1). The assist clutch torque also gradually increases as shown in the period of time from time t1 to time t2 of FIG. 13(F1). At this time, the transmission output torque gradually decreases as shown in the period of time from time t1 to time t2 of FIG. 13(G1). Then at time t2, the first meshing gearing 19, which has so far been engaged with the 1st speed side, is set into a state to be released. This is because torque transmitted by the gears 201 and 202 causes torque transmitted by the gears 4 and 12 to be decreased to a value that allows the first meshing gearing 19 to be released.

When the first meshing gearing 19 is in the state to be released, the actuator 27 is controlled so as to release the first meshing gearing 19, which has been engaged with the 1st speed side. The first meshing gearing 19 is thereby brought into a neutral position to initiate an actual gearshift, as shown in a period of time from time t2 to time t3 in FIG. 13(C1).

When the first meshing gearing 19 is in the neutral position, the assist clutch torque is controlled to bring the input shaft speed to a level corresponding to the 2nd speed. When the input shaft speed reaches a level corresponding to the 2nd speed as shown at time t4 of FIG. 13(B1), the first meshing gearing 19 is allowed to engage with the 2nd speed side as shown in a period of time from time t4 to time t5 of FIG. 13(B1).

When the command current is decreased as shown in a period of time from time t5 to time t6, during which the first meshing gearing 19 is engaged with the 2nd speed, the actual hydraulic pressure decreases as shown in the period of time from time t5 to time t6 of FIG. 13(E1). The assist clutch torque also decreases as shown in the period of time from time t5 to time t6 of FIG. 13(F1).

At this time, the transmission output torque gradually increases as shown in the period of time from time t5 to time t6 of FIG. 13(G1). When the release of the assist clutch torque is completed at time t6, torque is then transmitted only with the 2nd speed gear. This eliminates torque vibration in the transmission output, thereby reducing axle vibration at the end of the gearshift.

FIG. 14 shows a typical second setting value for the function f2 of step 1104 shown in FIG. 11.

The second setting value for the function f2 of step 1104 is a setting value obtained by adjusting the first setting value for the function f2 of step 1104 in consideration of response of the actual hydraulic pressure for driving the assist actuator 205 of FIG. 1. It is desirable that the second setting value of the function f2 in step 1104 be set to a greater value as the transmission input torque Tqin becomes greater. It is also desirable that the function f2 be set uniquely for each of different gearshift positions when releasing the assist gear clutch torque.

FIGS. 15(A1) through (G1) are timing charts showing conditions of the gearshift control shown in FIGS. 11 and 14. FIG. 15(A1) represents a transmission input torque transmitted to the transmission input shaft 10 shown in FIG. 1. FIG. 15(B1) represents the speed of the transmission input shaft 10 shown in FIG. 1. FIG. 15(C1) represents a position (a shift position) of the first meshing gearing 19 shown in FIG. 1. FIG. 15(D1) represents a command current applied to the hydraulic pressure control unit 102 driving the assist actuator 205 shown in FIG. 1. FIG. 15(E1) represents an actual hydraulic pressure for driving the assist actuator 205 shown in FIG. 1. FIG. 15(F1) represents the assist clutch torque. FIG. 15 (G1) represents the output torque of the transmission output shaft 18 shown in FIG. 1. The abscissa represents time.

FIGS. 15(A1) through 13(G1) show the transmission input torque, the input shaft speed, the shift position, the command current, the actual hydraulic pressure, the assist clutch torque, and the transmission output torque, respectively, at different timings during a gearshift from the 1st speed to the 2nd speed.

When a gearshift command to the 2nd speed is issued at time t1 during running in the 1st speed, gearshift control is started. When the command current is gradually increased as shown in a period of time from time t1 to time t2 of FIG. 15(D1), the actual hydraulic pressure gradually increases as shown in the period of time from time t1 to time t2 of FIG. 15 (E1). The assist clutch torque also gradually increases as shown in the period of time from time t1 to time t2 of FIG. 15(F1). At this time, the transmission output torque gradually decreases as shown in the period of time from time t1 to time t2 of FIG. 15(G1). Then at time t2, the first meshing gearing 19, which has so far been engaged with the 1st speed side, is set into a state to be released. This is because torque transmitted by the gears 201 and 202 causes torque transmitted by the gears 4 and 12 to be decreased to a value that allows the first meshing gearing 19 to be released.

When the first meshing gearing 19 is in the state to be released, the actuator 27 is controlled so as to release the first meshing gearing 19, which has been engaged with the 1st speed side. The first meshing gearing 19 is thereby brought into a neutral position to initiate an actual gearshift, as shown in a period of time from time t2 to time t3 in FIG. 15(C1). When the first meshing gearing 19 is in the neutral position, the assist clutch torque is controlled to bring the input shaft speed to a level corresponding to the 2nd speed. When the input shaft speed reaches a level corresponding to the 2nd speed as shown at time t4 of FIG. 15(B1), the first meshing gearing 19 is allowed to engage with the 2nd speed side as shown in a period of time from time t4 to time t5 of FIG. 15(B1).

When the command current is decreased as shown in a period of time from time t5 to time t6, during which the first meshing gearing 19 is engaged in the 2nd speed, the actual hydraulic pressure decreases as shown in the period of time from time t5 to time t6 of FIG. 15 (E1). The assist clutch torque also decreases as shown in the period of time from time t5 to time t6 of FIG. 15(F1). At this time, the transmission output torque increases as shown in the period of time from time t5 to time t6 of FIG. 15(G1). When the release of the assist clutch torque is completed at time t6, torque is then transmitted only with the 2nd speed gear. This eliminates torque vibration in the transmission output, thereby reducing axle vibration at the end of the gearshift.

In accordance with the present invention, release control of the transmitting torque variable mechanism can be optimally provided according to vehicle operating conditions.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A control unit for a gear type transmission including a plurality of gear trains,
   and a plurality of torque transmitting mechanisms that form a gearshift position between an input shaft and an output shaft of said transmission, at least one of said torque transmitting mechanisms being a transmitting torque variable mechanism and the remaining torque transmitting mechanisms being meshing gearings;
   wherein said control unit is configured to engage said transmitting torque variable mechanism when the gearshift position is changed, and to determine a controlled variable per unit time comprising release speed according to a vehicle operating condition when said transmitting torque variable mechanism is released only after the gearshift position change has been completed.

2. The control unit for a transmission according to claim 1, wherein the vehicle operating condition is an input torque of said transmission.

3. The control unit for a transmission according to claim 1, wherein said release speed is varied at least once during release of said transmitting torque variable mechanism.

4. The control unit for a transmission according to claim 1, wherein said release speed is varied at least once according to a change in output torque of the transmission, during release of said transmitting torque variable mechanism.

5. The control unit for a transmission according to claim 1, wherein said controlled variable includes a released amount of transmitting torque.

6. The control unit for a transmission according to claim 1, wherein said transmitting torque variable mechanism comprises an assist clutch whose torque is gradually released only after the gearshift position change has been completed.

7. A control method for a gear type transmission including a plurality of gear trains and a plurality of torque transmitting mechanisms that form a gearshift position between an input shaft and an output shaft of said transmission, at least one of said torque transmitting mechanisms being a transmitting torque variable mechanism and the remaining torque transmitting mechanisms being meshing gearings, comprising:
   engaging said transmitting torque variable mechanism when the gearshift position is changed; and
   determining a controlled released speed of said transmitting torque variable mechanism according to a vehicle operating condition when said transmitting torque variable mechanism is released only after the gearshift position changing has been completed.

8. A gear type transmission comprising:
   a plurality of gear trains; and
   a plurality of torque transmitting mechanisms that form a gearshift position between an input shaft and an output shaft of said transmission, at least one of said torque transmitting mechanisms being a transmitting torque variable mechanism and the remaining torque transmitting mechanisms being meshing gearings;
   wherein said transmitting torque variable mechanism is engaged when the gearshift position is changed, and
   a controlled release speed of said transmitting torque variable mechanism is determined according to vehicle operating condition when said transmitting torque variable mechanism is released only after the gearshift position change has been completed.

9. A vehicle comprising:
   a transmission including
   a plurality of gear trains, and
   a plurality of torque transmitting mechanisms that form a gearshift position between an input shaft and an output shaft of said transmission, at least one of said torque transmitting mechanisms being formed a transmitting torque variable mechanism and the remaining torque transmitting mechanisms being meshing gearings; and
   a control unit for said transmission configured to engage said transmitting torque variable mechanism when the gearshift position is changed, and determining a controlled release speed of said transmitting torque variable mechanism according to a vehicle operating condition only after the gearshift position change has been completed.

* * * * *